UNITED STATES PATENT OFFICE.

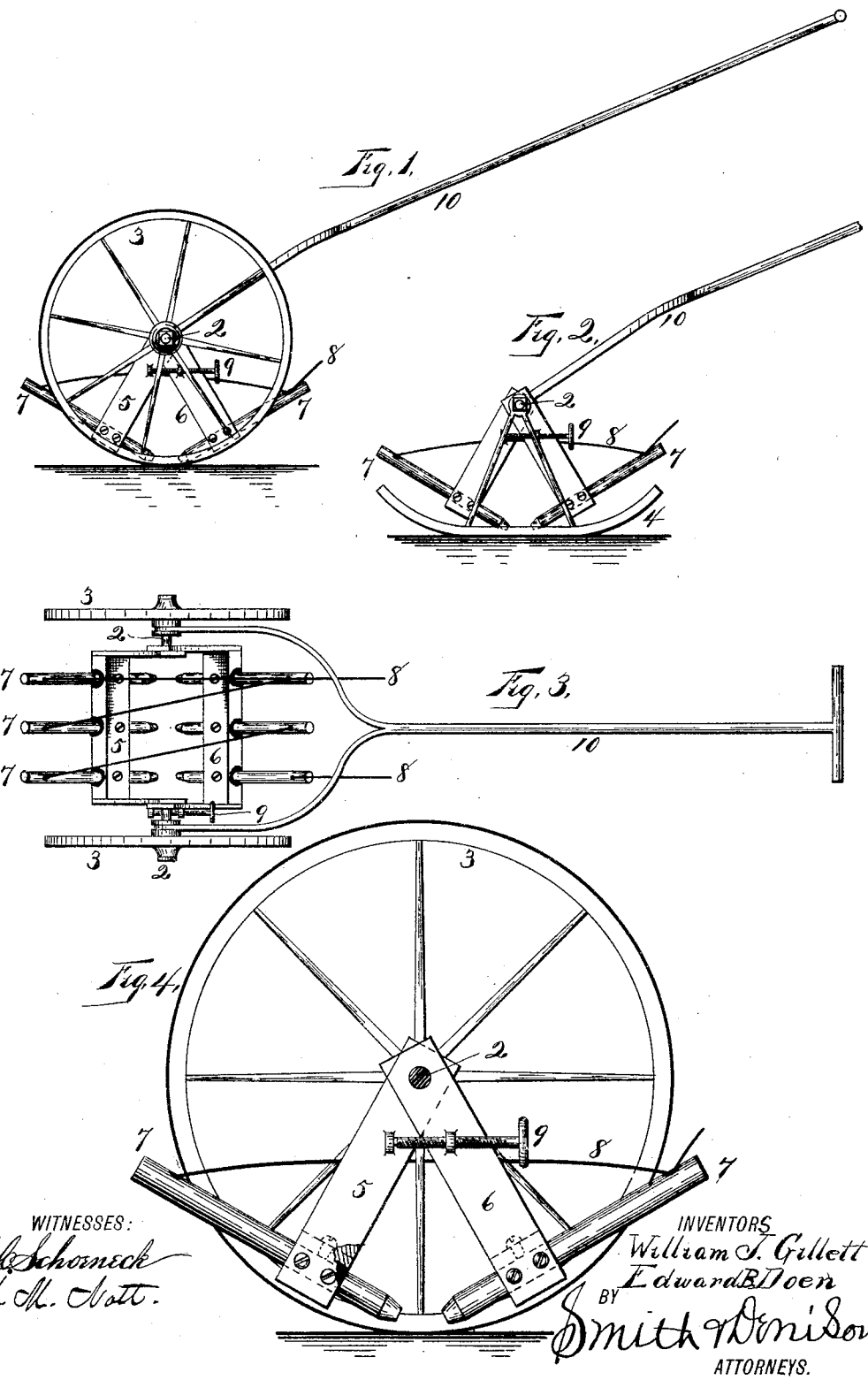

WILLIAM J. GILLETT AND EDWARD B. DOEN, OF SYRACUSE, NEW YORK.

SHEET-PAVEMENT SOFTENER.

SPECIFICATION forming part of Letters Patent No. 640,464, dated January 2, 1900.

Application filed March 28, 1899. Serial No. 710,783. (No model.)

*To all whom it may concern:*

Be it known that we, WILLIAM J. GILLETT and EDWARD B. DOEN, of Syracuse, in the county of Onondaga, in the State of New York, have invented a new and useful Sheet-Pavement Softener, of which the following, taken in connection with the accompanying drawings, is a full, clear, and exact description.

Our invention relates to an apparatus for softening sheet-pavements to be used in the laying or repair of street-pavements which are laid in sheets and are commonly known as "sheet-asphaltina" or "sheet-asphalt," &c., or any other kind of pavement which can be softened or melted by the application of heat. Heretofore whenever it has been desirable to remove or repair any part of such a pavement it has been broken out with axes or picks at great labor and expense, leaving the edges hard, so that the material used in its usual hot and semimelted and plastic condition will not make a proper bond with such edges, but will sometimes leave more or less of a slit or crack, through which water can flow under the paving-coat and into the ordinary concrete foundation, which will then sometimes freeze and be damaged and also leave said coat out of its normal level.

Our object is to provide a machine or apparatus by which the paving coat or sheet can be softened and more or less melted by the direct and local application of heat, whereby it is reduced to a soft and semiplastic condition, easily removable, as by a shovel, and by which when ready to be relaid the edges can be heated and softened and more or less melted, so that when the new hot material is put in place it will make a proper bond and tight joint therewith.

Our apparatus comprises a vehicle, either on wheels, shoes, or runners, which can be readily drawn or moved over the space to be heated and cut out, and suitable heaters mounted in a suitable frame, as carbons in pairs and in series, with suitable wiring to create an electric arc between their points, by which heat is generated and by the location of said carbon-points applied with more or less energy to the paving-coat, and by which it will be heated, so that it can be removed behind the apparatus as it is shifted. It is constructed as follows, reference being had to the accompanying drawings, in which—

Figure 1 is a side elevation of the apparatus on wheels. Fig. 2 is a like view thereof on runners. Fig. 3 is a top plan of Fig. 1. Fig. 4 is an enlarged side elevation of the same with a wheel removed.

A suitable axle or cross-beam 2 is suitably mounted in wheels 3 or runners 4 either in sections, as shown, or extending across the entire space. Upon this axle separate frames 5 6 are mounted loosely and provided with suitable openings or recesses to receive and hold the carbons 7 and set-screws for holding them. These frames are suitably insulated from their supports. A suitable system of wiring 8 conducts the electricity to the carbons and connects them in series to create electric arcs between their points, said arcs varying in intensity according to the adjustment of the frames by a hand-screw 9 or other suitable means, whereby the space between the carbon-points and their distance above the pavement are regulated.

A suitable pole or tongue 10 is provided.

This apparatus can also be used for thawing loose manhole-covers to permit access to conduits and subways.

We also use our invention in thawing frozen earth in making excavations in cold weather.

What we claim as our invention, and desire to secure by Letters Patent, is—

An apparatus for softening sheet-pavements comprising a suitable wheel-base and an axle in combination with separate frames comprising end bars mounted upon and radiating from said axle, and cross-bars connecting their free ends, carbons mounted in said cross-bars upon converging lines, and having their points in close proximity to the surface of the pavement, a hand-screw connecting said frames whereby they can be adjusted to regulate the distance between the points of said carbons, and means to create arcs between said points.

In witness whereof we have hereunto set our hands this 21st day of March, 1899.

WILLIAM J. GILLETT.
EDWARD B. DOEN.

Witnesses:
C. W. SMITH,
HOWARD P. DENISON.